(12) United States Patent
Herbst et al.

(10) Patent No.: US 11,420,479 B2
(45) Date of Patent: Aug. 23, 2022

(54) PNEUMATIC VEHICLE TIRE

(71) Applicant: Continental Reifen Deutschland GmbH, Hannover (DE)

(72) Inventors: Stephan Herbst, Langenhagen (DE); Stefan Rittweger, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 303 days.

(21) Appl. No.: 16/326,614

(22) PCT Filed: Jun. 13, 2017

(86) PCT No.: PCT/EP2017/064351
§ 371 (c)(1),
(2) Date: Feb. 19, 2019

(87) PCT Pub. No.: WO2018/033268
PCT Pub. Date: Feb. 22, 2018

(65) Prior Publication Data
US 2019/0275845 A1    Sep. 12, 2019

(30) Foreign Application Priority Data

Aug. 18, 2016   (DE) .......................... 102016215448.6

(51) Int. Cl.
*B60C 11/13*        (2006.01)
*B60C 11/03*        (2006.01)
(52) U.S. Cl.
CPC ...... *B60C 11/1353* (2013.01); *B60C 11/0306* (2013.01); *B60C 11/0309* (2013.01);
(Continued)
(58) Field of Classification Search
CPC ......... B60C 2011/0381; B60C 11/1369; B60C 2011/1361; B60C 2011/1338
See application file for complete search history.

(56) References Cited

U.S. PATENT DOCUMENTS

| 8,225,831 | B2 | 6/2012 | Kojima | |
| 2009/0320981 | A1* | 12/2009 | Matsumoto | B60C 11/13 152/209.8 |

(Continued)

FOREIGN PATENT DOCUMENTS

| DE | 102007047496 A1 | 4/2009 |
| EP | 1950060 A1 | 7/2008 |

(Continued)

OTHER PUBLICATIONS

KR200445685Y1 Heavy-Duty Pneumatic Tire. (Original document) (Year: 2009).*

(Continued)

*Primary Examiner* — Timothy Kennedy
*Assistant Examiner* — Farah Taufiq
(74) *Attorney, Agent, or Firm* — Gregory Adams; David L. Cate

(57) ABSTRACT

A pneumatic vehicle tire having a tread divided by circumferential grooves, which have a profile depth (T), into block rows running in encircling fashion in a circumferential direction and/or profile ribs which are structured in the manner of profile blocks. Block rows are divided by transverse grooves into blocks and, like the profile ribs structured in the manner of profile blocks, are equipped with blind grooves proceeding from the circumferential grooves. Transverse and/or blind grooves are provided which, owing to a connection of blocks adjacent in the circumferential direction and/or of the block-like structures, have a depth smaller than profile depth (T). The connection has at least two connection steps of different heights, the lowest is formed in each case at the region in which the transverse grooves and/or blind grooves open into the circumferential grooves.

8 Claims, 1 Drawing Sheet

(52) U.S. Cl.
CPC ............... *B60C 2011/0341* (2013.01); *B60C 2011/0346* (2013.01); *B60C 2011/0369* (2013.01); *B60C 2011/0374* (2013.01); *B60C 2011/0379* (2013.01); *B60C 2011/0381* (2013.01); *B60C 2011/1361* (2013.01); *B60C 2200/14* (2013.01)

(56) References Cited

U.S. PATENT DOCUMENTS

| | | | |
|---|---|---|---|
| 2017/0197473 A1* | 7/2017 | Kurosawa | ........... B60C 11/0306 |
| 2018/0015787 A1 | 1/2018 | Hayashi | |
| 2019/0061431 A1* | 2/2019 | Shibai | ..................... B60C 11/03 |

FOREIGN PATENT DOCUMENTS

| | | | | |
|---|---|---|---|---|
| JP | 5675004 U | | 6/1981 | |
| JP | 2010126046 A | * | 6/2010 | ......... B60C 11/1369 |
| JP | 2010126046 A | | 6/2010 | |
| KR | 445685 | * | 8/2009 | |
| WO | 2016121858 A1 | | 8/2016 | |

OTHER PUBLICATIONS

International Search Report dated Sep. 19, 2017 of corresponding patent application PCT/EP2017/064351 on which this application is based.

* cited by examiner

PNEUMATIC VEHICLE TIRE

CROSS REFERENCE TO RELATED APPLICATIONS

This application is the national stage of PCT/EP2017/064351, filed Jun. 13, 2017, designating the United States and claiming priority from German patent application no. 10 2016 215 448.6, filed Aug. 18, 2016, the entire contents of which are incorporated herein by reference.

FIELD OF THE INVENTION

The invention relates to a pneumatic vehicle tire, in particular all-terrain or off-road tire, having a tread which is divided by circumferential grooves, which have the provided profile depth, into block rows which run in encircling fashion in a circumferential direction and/or profile ribs which are structured in the manner of profile blocks, wherein block rows are divided by transverse grooves into blocks and, like the profile ribs structured in the manner of profile blocks, are equipped with blind grooves proceeding from the circumferential grooves.

BACKGROUND OF THE INVENTION

All-terrain or off-road tires generally have a tread which has a pronounced block structure, for example by virtue of the tread being equipped with profile block rows and/or with tread bands structured in the manner of blocks, wherein, depending on the preferred use, that is, whether the tire is provided primarily for off-road use or the tire is also driven on paved ground, a rib-like structuring or a structuring in block rows is prevalent. In the case of known tires, which are intended to be suitable equally for use under off-road conditions and for use on paved ground, that is, on roads, good off-road characteristics are normally associated with less good driving characteristics on roads, in particular on dry roads. In particular owing to the relatively high profile depth required in treads of off-road tires, which is necessary on unpaved ground in order to ensure good traction characteristics, there are inevitable disadvantages on dry paved roads, in particular as regards the handling characteristics and the braking characteristics.

SUMMARY OF THE INVENTION

It is an object of the invention to improve a pneumatic vehicle tire having a tread such that the pneumatic vehicle tire has good driving characteristics even on paved, in particular dry ground, wherein it is sought to maintain good traction characteristics on unpaved, in particular muddy ground. The stated object can, for example, be achieved in that transverse grooves and/or blind grooves are provided which, owing to a connection of those blocks which are adjacent in the circumferential direction and/or of the block-like structures, have a depth smaller than the profile depth, wherein the connection has at least two connection steps of different heights, of which the lowest is formed in each case at the region in which the transverse grooves and/or blind grooves open into the circumferential grooves, and the highest connection step is formed in transverse grooves in the middle region thereof and in blind grooves in the inner end region thereof.

Stiffening of the tread is realized via the connection steps in transverse grooves and blind grooves. The tall profile positives owing to the large profile depth no longer deform to such a great extent during driving on dry, paved ground, such that the handling characteristics and the braking characteristics on such ground are significantly improved. The highest connection step is even capable of improving the traction characteristics on soft, muddy ground, because shallow grooves fill with soft ground material more quickly and more easily.

In an embodiment, provision is made for the connection to have two connection steps of different heights, or to be made up of two connection steps of different heights. With two connection steps of different heights, it is possible in a particularly effective manner to achieve an advantageous stiffening of the profile positives.

The effect of particularly advantageous influencing of the profile stiffness can be supported through a number of further measures. These measures include the lowest connection step having a height of 15% to 25% of the profile depth and also the lowest connection step having a step surface whose extent direction in a circumferential direction is greater than its extent in the direction of the transverse groove or blind groove extent.

It can be particularly advantageous for an optimum connection, in the case of connection steps formed in a blind groove, if the highest connection step has a step surface which is at least 30% larger than the step surface of the lowest connection step. In the case of a connection formed in a transverse groove, it is advantageous if the highest connection step is formed over 60% to 80% of the extent length of the transverse groove.

For the braking characteristics and the handling characteristics on dry, paved ground, it is particularly expedient if, in the case of the connection formed in a transverse groove, the highest connection step has a height which amounts to 30% to 40% of the profile depth, and if, in the case of the connection formed in a blind groove, the highest connection step has, at its step edge, a height which amounts to 30% to 40% of the profile depth, wherein the height rises in the direction of the blind groove end and may be up to 1.0 mm greater at the blind groove end.

In the case of embodiments in which the connection has two connection steps of different heights or is made up of two connection steps of different heights, it is furthermore expedient if these are equipped with step edges extending at least substantially at an angle of 10° to 30° with respect to one another. In this way, the connection steps can provide additional grip edges on soft, muddy ground or on snow.

An embodiment is also particularly advantageous in which the connection steps are equipped with step edges along which webs run on the step surfaces, the height and the width of which webs at their base amount to 0.5 mm 1.0 mm. The webs contribute in a particularly effective manner to improving the traction on soft or muddy ground and on snow, in particular because they prevent soft ground material from slipping through the transverse grooves.

BRIEF DESCRIPTION OF THE DRAWINGS

The invention will now be described with reference to the drawings wherein.

DESCRIPTION OF THE PREFERRED EMBODIMENTS OF THE INVENTION

The disclosure is concerned with a particular configuration of a tread 1 of a pneumatic vehicle tire, which is suitable equally for off-road use and for use on roads. Such tires are commonly referred to as all-terrain tires or as off-road tires, and their treads have a greater profile depth—in the region of 12 mm—than the conventional tires for passenger motor vehicles. The greater profile depth is required in particular for good traction characteristics of such tires on unpaved ground.

In the description that follows angles specified in the context of grooves relate to the centerlines or to the extent directions of the grooves. All heights are measured in a radial direction.

Figure 1:
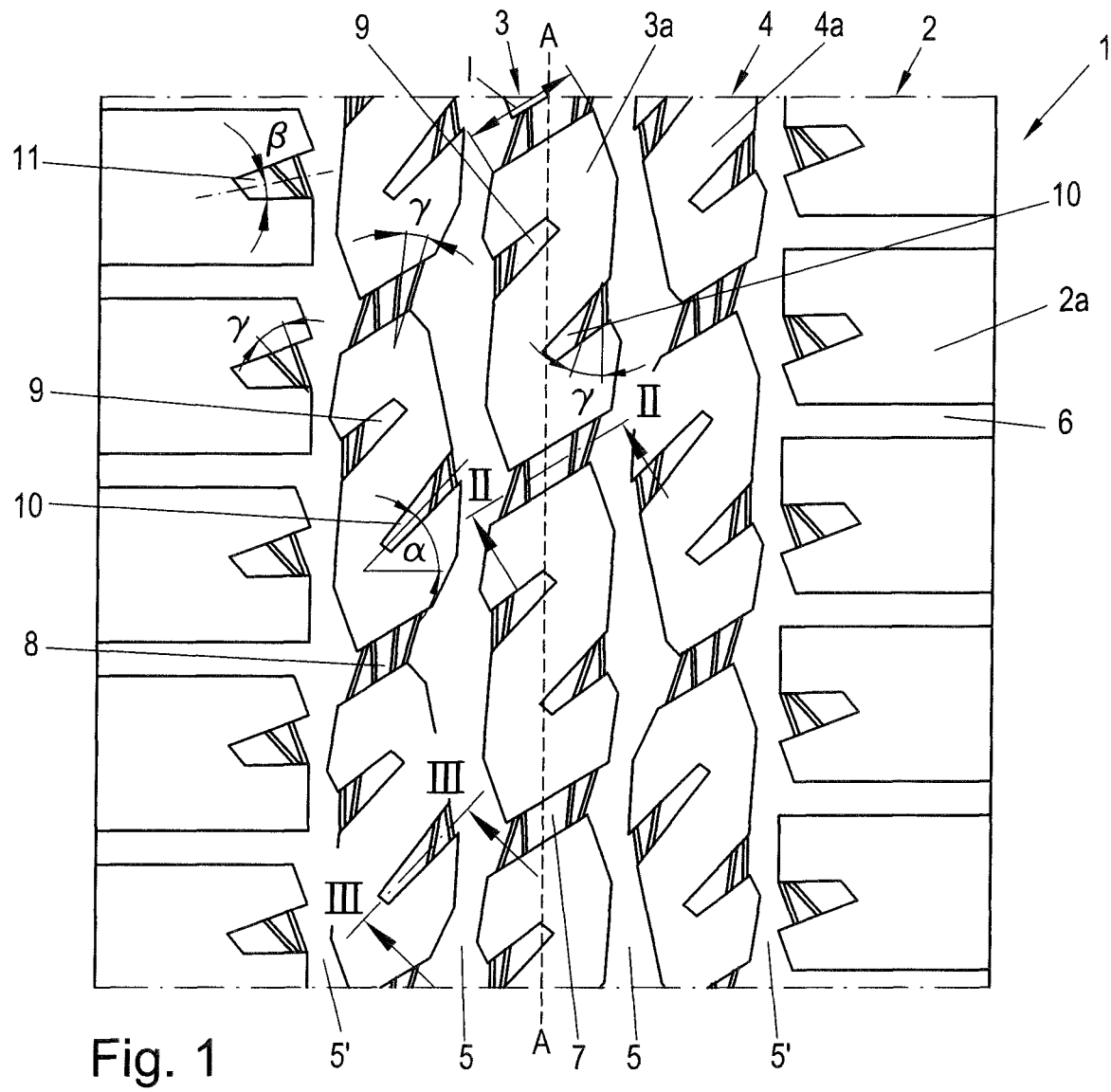
FIG. 1 shows a plan view of a circumferential portion of a tread of a pneumatic vehicle tire.
Figure 2:
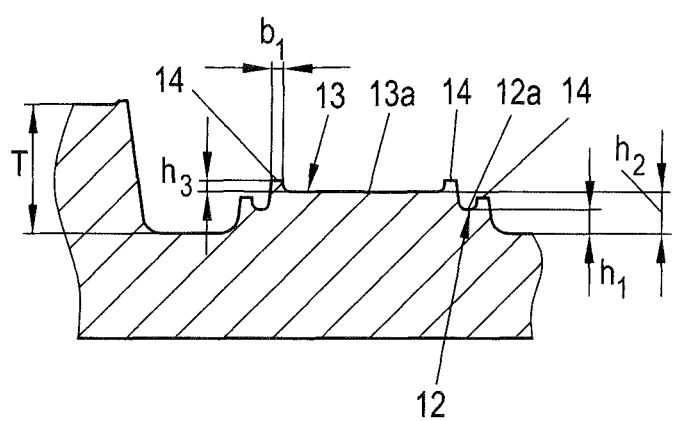
FIG. 2 shows a section along the line II-II in FIG. 1.

The tread 1 shown in FIG. 1 has a pronounced block structure with in each case one shoulder-side block row 2, one central block row 3 running along the tire equator (line A-A), and two middle block rows 4, which are arranged between the central block row 3 and the shoulder-side block rows 2. Circumferential grooves 5 run between the central block row 3 and the two middle block rows 4, and in each case one circumferential groove 5' runs between the middle block rows 4 and the shoulder-side block rows 2. The depth of the circumferential grooves 5, 5' corresponds to the provided maximum profile depth T (FIG. 2). The individual block rows 2, 3 and 4 are made up, in a circumferential direction, of blocks 2a, 3a and 4a, which are separated from one another by transverse grooves 6 (blocks 2a), transverse grooves 7 (blocks 3a) and transverse grooves 8 (blocks 4a). Via the configuration of those block edges of the blocks 2a, 3a and 4a which are oriented in the circumferential direction, the circumferential grooves 5, 5' have a slightly undulating or zigzag-shaped profile in plan view. In particular, the middle block rows 4 and/or the central block row 3 may be replaced by ribs which are structured in the manner of blocks.

The blocks 4a in the middle block rows 4 and the blocks 3a in the central block row 3 are elongate in the circumferential direction and are of substantially S-shaped configuration in plan view, by virtue of blind grooves 9, 10 running into the blocks 3a, 4a proceeding from the circumferential grooves 5, 5' that run to the side of the block rows 3, 4. The two blind grooves 9, 10 are offset with respect to one another in the circumferential direction and have substantially corresponding extent directions, wherein they enclose an angle α of 20° to 50° with the axial direction. Blind grooves 11 also run into the blocks 2a of the shoulder-side block rows 2 proceeding from the circumferential groove 5, in each case approximately in the middle in the block 2a and substantially in an axial direction or at a small acute angle β of up to 30° relative to the axial direction. The transverse grooves 7 and 8 which separate the blocks 3a of the central block row and the blocks 4a of the middle block rows 4 from one another run substantially parallel to the blind grooves 9, 10. All of the blocks 2a, 3a, 4a may furthermore be equipped, in a manner known per se, with sipes (not illustrated), which have a width from 0.4 mm to 1.0 mm and which extend substantially in the axial direction.

If a rib structured in the manner of blocks is provided instead of each middle block row and/or the central block row, the rib has no continuous transverse grooves but likewise has blind grooves which are arranged offset with respect to one another in the circumferential direction and which begin alternately at one and at the other circumferential groove, such that the block-like profile positives form a band which runs in meandering encircling fashion in the circumferential direction.

The multiplicity of transverse grooves 6, 7, 8 and blind grooves 9, 10 and 11 gives rise to good off-road characteristics of pneumatic vehicle tires, in particular on soft or muddy ground. In order to ensure good handling characteristics and braking characteristics on dry ground, in particular on paved roads, despite the large profile depth, the transverse grooves 6, 7 and 8 and the blind grooves 9, 10 and 11 are configured in a particular way with a smaller depth than the circumferential grooves 5, 5'. This smaller depth is achieved via a particularly advantageous connection of the profile positives to one another.

Figure 3:
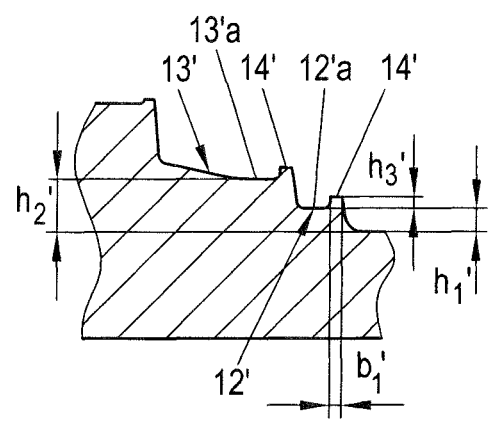
FIG. 3 shows a section along the line III-III in FIG. 1.

FIG. 2 illustrates the connection on the basis of a transverse groove 7, and FIG. 3 illustrates the connection on the basis of a blind groove 10. As shown in FIG. 2, in the regions in which the transverse groove 7 opens into in each case one of the circumferential grooves 5, there is situated a first connection step 12 which, measured from the groove base of the circumferential grooves 5, has a height $h_1$ of 15% to 25% the profile depth T. This first connection step 12 may, depending on the configuration of the blocks 3a, also extend a short distance along the circumferential groove 5 in the circumferential direction, for example by virtue of the step flank running substantially as a continuation of a block flank, which delimits the circumferential groove 5, of the respective profile block 3a. The upper step surface 12a of the connection step 12 furthermore has a greater extent in the circumferential direction than in the direction in which the respective transverse groove 7 runs or extends. Over the major part of the extent of the transverse groove 7, in particular over 60% to 80% of its extent length l, there is situated a second connection step 13, the height $h_2$ of which, likewise in relation to the base of the circumferential grooves 5, is at least 1.0 mm greater than the height $h_1$ and amounts to 30% to 40% of the profile depth T. The step surfaces 12a, 13a of the first and second connection steps 12, 13 each have a constant level. The extent directions of the step edges of the second connection step 13 may run parallel to one another or at an acute angle γ of 10° to 30° with respect to one another.

In each case one web 14 is formed directly adjacent to the step edges of the connection steps 12, 13, and so as to run along the connection steps 12, 13, on the step surfaces 12a, 13a thereof, which web has a height $h_3$ of 0.5 mm to 1.0 mm in relation to the respective step surface 12a, 13a and, at its base, has a width $b_1$ of likewise 0.5 mm to 1.0 mm. The webs 14 contribute to an improvement in traction on soft or muddy ground, because they prevent such ground material from slipping through the transverse grooves 7. The webs 14 furthermore improve the traction of the tire on snow.

The blind grooves 9, 10 and 11 in the blocks 2a, 3a and 4a of the block rows 2, 3 and 4 also have a depth reduced via two connection steps 12', 13', as will now be described in more detail on the basis of a blind groove 10 and FIG. 3. The first connection step 12' is situated in the region in which the blind groove 10 opens into the circumferential groove 5, and has a height $h_1'$ which corresponds to the height $h_1$ as already described. The second connection step 13' directly adjoins the first connection step 12' and extends from the first connection step 12' to the inner end of the blind groove 9, wherein the height of the second connection step $h_2'$ increases toward the end of the blind groove 10. The height $h_2'$ at the step edge amounts to at least 1.0 mm more than the height $h_1'$ and to 30% to 40% of the profile depth T, and at the inner end of the blind groove 9, the height $h_2'$ is up to 1.0 mm greater. Depending on the configuration of the block flanks along the circumferential grooves 5, 5', the first connection step 12' may also extend a short distance along the circumferential grooves 5, 5'. The step edges of the two connection steps 12', 13' may run parallel to one another, and they preferably run such that their extent directions enclose an acute angle γ of 10 to 30° with one another, wherein the step edges may have a profile which is not straight and which has at least one bend point. The step surface 13'a of the higher connection step 13 is larger, in particular by at least 30%, than the step surface 12'a. The second connection step 13' thus covers a larger part of the channel base than the first connection step 12'. The connection steps 12', 13' may also have webs 14' formed along the step edges, the height $h_3'$ and width $b_1'$ of which webs amount to 0.5 to 1.0 mm.

It is basically possible for more than two, in particular three, connection steps to be provided, the height of which increases in stepwise fashion in the direction of the groove interior. In this case, the lowest connection step has the dimensions specified with regard to the lower connection step in the described examples, and the highest connection step has the dimensions specified with regard to the higher connection step in the described examples. The connection steps are thus arranged in a terraced manner.

It is understood that the foregoing description is that of the preferred embodiments of the invention and that various changes and modifications may be made thereto without departing from the spirit and scope of the invention as defined in the appended claims.

LIST OF REFERENCE NUMERALS

1 . . . Tread
2 . . . Shoulder-side block row
2a . . . Block
3 . . . Central block row
3a . . . Block
4 . . . Middle block row
4a . . . Block
5, 5' . . . Circumferential groove
6, 7, 8 . . . Transverse groove
9, 10, 11 . . . Blind groove
12, 12' . . . Connection step
12a, 12'a . . . Step surface
13, 13' . . . Connection step
13a, 13'a . . . Step surface
14, 14' . . . Web
α, β, γ . . . Angle
$b_1$, $b_1'$ . . . Width
$h_1$, $h_2$, $h_3$ . . . Height
$h_1'$, $h_2'$, $h_3'$ . . . Height
l . . . Extent length
T . . . Profile depth

The invention claimed is:

1. A pneumatic vehicle tire defining a circumferential direction, the pneumatic vehicle tire comprising:
a tread having a plurality of block rows which run in encircling fashion in a circumferential direction;
said plurality of block rows separated by circumferential grooves and said plurality of block rows comprising shoulder block rows, middle block rows adjacent the shoulder block rows and a central block row adjacent the middle block rows;
and a plurality of circumferential grooves in the plurality of block rows;
the middle block rows and the central block row divided by transverse grooves into blocks, the blocks provided with profiled ribs with blind grooves extending from the circumferential grooves;
said circumferential grooves having a circumferential groove profile depth (T);
said transverse grooves and said blind grooves each having a groove profile depth which is smaller than said circumferential groove profile depth (T) due to a corresponding connection of corresponding ones of said profile blocks, which are mutually adjacent in the circumferential direction, and of said profile ribs structured in the manner of profile blocks, which are mutually adjacent in the circumferential direction, wherein said connection has at least two connection steps of different heights; and,
said at least two connection steps including a lowest connection step formed in each case at a region in which the corresponding one of said transverse grooves and said blind grooves open into said circumferential grooves and further including a highest connection step formed in said transverse grooves in a middle region thereof and in said blind grooves in an inner end region thereof;
in the case of said connections formed in one of said transverse grooves, said highest connection step is formed over 60% to 80% of an extent length (l) of said transverse groove and said highest connection step has a height (h2) which amounts to 30% to 40% of said circumferential groove profile depth (T); and
a first web formed directly adjacent to a step edge of the lowest connection step and a second web formed directly adjacent to a step edge of the highest connection step, the second web has a height h3 of 0.5 mm to 1.0 mm in relation to a surface of the highest connection step.

2. The pneumatic vehicle tire of claim 1, wherein said connection has two connection steps of different heights or consists of two connection steps of different heights.

3. The pneumatic vehicle tire of claim 1, wherein said lowest connection step has a height of 15% to 25% of said circumferential groove profile depth (T).

4. The pneumatic vehicle tire of claim 1, wherein said lowest connection step has a step surface having a first extent in the circumferential direction and a second extent in a direction of extent of the corresponding transverse groove or blind groove; and, said first extent is greater than said second extent.

5. The pneumatic vehicle tire of claim 1, wherein in the case of the connection formed in one of said blind grooves, said highest connection step has a step surface which is at least 30% larger than a step surface of said lowest connection step.

6. The pneumatic vehicle tire of claim 1, wherein, in the case of said connections formed in one of said blind grooves, said highest connection step has a step edge at which said connection step has a height (h2') which amounts to 30% to 40% of said circumferential groove profile depth (T), wherein said height (h2') rises in the direction of a blind groove end and is up to 1.0 mm greater at said blind groove end.

7. The pneumatic vehicle tire of claim 2, wherein said connection has two connection steps of different heights or consists of two connection steps of different heights, which are equipped with step edges extending at least substantially at an angle (γ) of 10° to 30° with respect to one another.

8. The pneumatic vehicle tire of claim 1, wherein the pneumatic vehicle tire is an all-terrain tire or an off-road tire.

* * * * *